Patented May 4, 1937

2,079,487

UNITED STATES PATENT OFFICE 2,079,487

ESTERS OF DICARBOXYLIC ACIDS AND SUBSTITUTED PHENOLS

Thomas S. Carswell, Kirkwood, Mo., assignor to Monsanto Chemical Company, St. Louis, Mo., a corporation of Delaware No Drawing. Application December 6, 1934, Serial No. 756,277

10 Claims. (Cl. 260—103)

This invention relates to a new class of esters and it has particular relation to the esters of dicarboxylic acids with phenols containing hydrocarbon substituents of relatively high molecular weight in the benzene nucleus described as plasticizers for artificial resins in my copending application Serial Number 732,000, filed June 22, 1934, which has matured into Patent No. 2,006,345.

The main objects of the invention are to provide a new class of esters which are highly resistant to weathering and chemical decomposition; which are non-odorous; which are non-crystalline or even fluid at normal room temperatures; which are readily admixable with artificial resins to provide compatible non-volatile and durable plasticizers therein.

Dialkyl esters of such dicarboxylic acids as phthalic acid, succinic acid, maleic acid and fumaric acid have heretofore been prepared and their use for such technical purposes as the plasticization of cellulosic esters, alkyl resins, phenol resins, etc. has been suggested. However, commercial application of these compounds in many important fields has been retarded by reason of the fact that they tended to decompose or hydrolyze when exposed to weathering or to the action of such chemical agencies as acids, alkalies and salts.

This invention involves the discovery that the above noted dicarboxylic acids may be esterified with phenols containing such substituents having at least three carbon atoms, such as tertiary alkyl hydrocarbon groups, aralkyl or aryl groups which are linked to the benzene nucleus of the phenol. Esters of this character are highly suitable for the purposes for which the alkyl esters have heretofore been employed and they are free to a remarkable degree of the objectionable features encountered in connection with the alkyl esters heretofore known in the arts.

The di(para tertiary butyl) phenol phthalate constitutes an example of an ester which is within the purview of the present invention. An excellent method of preparing this compound involves the reaction of phthalyl chloride with para isobutyl phenol. In this reaction approximately two mols of para tertiary butyl phenol are reacted with one mol. of the phthalyl chloride by admixture of the two ingredients followed by subsequent gradual heating of the mixture from a temperature of about 50° C. to 105° C. Hydrogen chloride is evolved and the evolution may be facilitated by the application of vacuum to the reaction vessel. The evolution of the hydrogen chloride may also be facilitated by bubbling a dry but inert gas, such as nitrogen, through the mixture. Reaction usually continues for a period of about ten to eighteen hours. The desired product is obtained by dissolving the reaction mixture in alcohol and then cooling the solution to about 5° C. whereupon the product crystallizes out and may be filtered from the alcoholic solution. This product has a melting point of 139.5°–140° C.

The di(para benzyl phenol) phthalate may be prepared by substantially the same method by the mere substitution of para benzyl phenol for the para tertiary butyl phenol. This product is of crystalline structure and melts at a temperature of 122.5°–123° C. It is colorless, odorless and is readily soluble in hot linseed oil and hot tung oil.

The di(ortho benzyl phenol) phthalate and the di(ortho phenyl phenol) phthalate are likewise prepared in the same manner as the di (para tertiary butyl phenol) phthalate by the substitution of the ortho benzyl phenol or ortho phenyl phenol for the para tertiary butyl phenol in the first described reaction. These compositions, like most of the compounds obtained from ortho substituted phenols, are non-crystalline in character and for that reason the simple process of crystallization above described for the purification of the reaction product is not applicable. However, purification may readily be effected by dissolving the crude material in benzol and washing about three times with dilute aqueous sodium hydroxide. The benzol solution should be washed three times with water and if an uncolored product is desired it may be necessary to subject it to a process of decolorization before removal of the solvent.

This decolorization is readily and economically effected by washing with a solution of a permanganate such as potassium permanganate. Satisfactory results are usually obtained by employing about 1% of sodium or potassium permanganate (based on the quantity of ester which is being treated). This permanganate should be made into a 1% or 2% solution. Ordinary atmospheric temperatures are employed in the treatment and the treatment is continued for a period of several (usually 10 to 20) hours or until a distinct permanganate coloration persists in the aqueous fraction. The manganese dioxide which is precipitated by the treatment may be washed out readily with the aid of sulphur dioxide or of a sulphite, such as sodium sulphite, in the presence of a small quantity of sulphuric acid. The precipitated manganese dioxide may also be separated by filtration. In any event, after removal of the manganese dioxide the product is carefully washed with water to remove any water soluble substances.

The product is dried by heating for a period of ten to fourteen hours at a temperature of about 100° C. During the later stages, a vacuum of about 5 to 8 mm. pressure should be applied in order to remove the last traces of benzol.

In the case of the benzyl phenol ester the product will be in the form of light amber, tacky resin which is soluble in linseed oil and tung oil at ordinary temperature. The phenyl phenol product is a less tacky product but it is also of resinous consistency.

The same methods are applicable to the preparation of numerous phenol esters of phthalic acid. For example, phenols containing iso or tertiary amyl or octyl or 3-ethyl hexyl groups substituted therein may be caused to react with the phthalyl chloride to form amyl, octyl and 3-ethyl hexyl phenol phthalates.

Any of the above substituted phenols may be employed in the esterification of various other dicarboxylic acids than the phthalic acid which has been described as an example of an embodiment of the invention. For example, the phthalic acid or phthalyl chloride may be replaced by succinyl chloride to form succinate esters. Also, the use of maleic acid and fumaric acid chlorides are contemplated as additional embodiments of the invention.

Likewise the various dicarboxylic acids may be esterified with di-substituted phenols, an example of this character being substituted cresol which may comprise a mixture of the various possible isomers (ortho, meta or para) or any one or more of the purified isomeric substances. It will, of course, be appreciated that where cresol is employed to esterify the dicarboxylic acid, that the benzene nucleus contains, in addition to the hydroxy and methyl groups characteristic of cresol, a branched hydrocarbon (tertiary butyl, octyl, amyl, benzyl, phenyl, etc.) group which has already been described as characteristic of the compounds embraced within the purview of the present invention.

It may be stated that the phenols containing a hydrocarbon group (butyl, amyl, octyl, benzyl, phenyl, etc.) substituted in the ortho position with respect to the hydroxy group are especially suitable for the esterification of the dicarboxylic acids in accordance with the provisions of the present invention because the resultant products possess a high degree of fluidity or resistance to crystallization at relatively low temperatures and exhibit a greater degree of compatibility with resins than do the corresponding para compounds. While the products obtained from the para substituted phenols may exhibit a greater tendency to form solid and crystalline materials they are still embraced within the purview of the present invention and are quite satisfactory for many purposes.

The compounds, as thus described, may be prepared readily and economically from relatively inexpensive materials. They are characterized by a high degree of compatibility with resins, especially the artificial resins, to which they impart flexibility and unexpected resistance to alkalies, etc. They exhibit great resistance to weathering and aging and to the action of bases which quickly result in the hydrolyzation of many esters particularly alkyl esters of the dicarboxylic acids. For this reason they are eminently satisfactory for use in compositions which are exposed to the action of chemical agencies.

Although I have shown and described only the preferred embodiments of the invention it is to be understood that these embodiments are only included for purposes of illustration. Various embodiments may readily be employed without departure from the spirit of the invention or the scope of the appended claims.

What I claim is:

1. As a new chemical compound, a neutral ester of a dicarboxylic acid selected from a group consisting of phthalic acid, succinic acid, fumaric acid and maleic acid with a phenol selected from a group consisting of phenol and cresol, the phenol further containing as a substituent in the benzene nucleus a group selected from the class consisting of phenyl, benzyl, octyl, butyl and amyl.

2. A composition as defined in claim 1 wherein the hydrocarbon substituent is in ortho relation with respect to the hydroxy group of the phenol.

3. As a new chemical compound, a neutral ester of a dicarboxylic acid and a phenol, said phenol having substituted in the nucleus thereof a monovalent aryl hydrocarbon group.

4. A composition as defined in claim 3 in which the substituent group consists of a single benzene nucleus.

5. A composition as defined in claim 3 in which the substituent consists of a benzyl group.

6. As a new chemical compound, di(aryl phenyl) phthalate.

7. As a new chemical compound, di(tertiary alkyl phenyl) phthalate.

8. As a new chemical compound, di(tertiary amyl) phenyl phthalate.

9. As a new chemical compound, di(benzyl phenyl) phthalate.

10. As a new chemical compound, di(phenyl phenyl) phthalate.

THOMAS S. CARSWELL.

CERTIFICATE OF CORRECTION.

Patent No. 2,079,487. May 4, 1937.

THOMAS S. CARSWELL.

It is hereby certified that error appears in the printed specification of the above numbered patent requiring correction as follows: Page 1, first column, line 22, for "alkyl" read alkyd; and that the said Letters Patent should be read with this correction therein that the same may conform to the record of the case in the Patent Office.

Signed and sealed this 7th day of December, A. D. 1937.

(Seal)

Henry Van Arsdale,
Acting Commissioner of Patents.